United States Patent
Berliet et al.

(10) Patent No.: US 8,893,875 B2
(45) Date of Patent: Nov. 25, 2014

(54) CONVEYOR DEVICE FOR CONVEYING FLAT ARTICLES ON EDGE, AND A POSTAL SORTING MACHINE

(71) Applicant: SOLYSTIC, Gentilly Cedex (FR)

(72) Inventors: Damien Berliet, Bourg les Valence (FR); Olivier De Sousa, Montmeyran (FR); Arnaud Caron, Valence (FR)

(73) Assignee: SOLYSTIC, Gentilly Cedex (FR)

( * ) Notice: Subject to any disclaimer, the term of this patent is extended or adjusted under 35 U.S.C. 154(b) by 0 days.

(21) Appl. No.: 13/813,301

(22) PCT Filed: Oct. 25, 2012

(86) PCT No.: PCT/FR2012/052457
§ 371 (c)(1),
(2), (4) Date: Jan. 30, 2013

(87) PCT Pub. No.: WO2013/088009
PCT Pub. Date: Jun. 20, 2013

(65) Prior Publication Data
US 2014/0158499 A1    Jun. 12, 2014

(30) Foreign Application Priority Data
Dec. 13, 2011 (FR) ...................................... 11 61558

(51) Int. Cl.
*B65G 47/26* (2006.01)
*B65G 47/46* (2006.01)
*B65H 29/12* (2006.01)
*B65H 29/52* (2006.01)
*B65H 29/58* (2006.01)

(52) U.S. Cl.
CPC .......... *B65G 47/46* (2013.01); *B65H 2404/632* (2013.01); *B65H 29/12* (2013.01); *B65H 2701/1916* (2013.01); *B65H 29/52* (2013.01); *B65H 2402/31* (2013.01); *B65H 2601/11* (2013.01); *B65H 29/58* (2013.01); *B65H 2301/321* (2013.01)

USPC .......................................... 198/442; 198/436

(58) Field of Classification Search
CPC .... B65H 29/58; B65H 29/60; B65H 2404/63; B65G 47/41; B65G 47/46
USPC ............. 198/436, 442, 457.07; 271/296, 297, 271/303
See application file for complete search history.

(56) References Cited

U.S. PATENT DOCUMENTS 4,119,194 A * 10/1978 Freeman et al. ............... 198/442
4,431,179 A    2/1984 Westover et al.

(Continued)

FOREIGN PATENT DOCUMENTS

| DE | 102007007813 B3 | 1/2008 |
| EP | 1344736 A2 | 9/2003 |
| FR | 2787773 A1 | 6/2000 |

OTHER PUBLICATIONS

French Search Report issued in FR1161558 dated Aug. 2, 2012, 2 pages.

(Continued)

*Primary Examiner* — James R Bidwell
(74) *Attorney, Agent, or Firm* — Rothwell, Figg, Ernst & Manbeck, P.C.

(57) ABSTRACT

A conveyor device for conveying flat articles on edge, for example as part of a postal sorting machine, includes a back belt and a front belt that define a first nip zone for conveying the flat articles along a first path, a conveying strip provided with a first slide plate supporting the flat articles and mounted to move between a working position in which it is situated adjacent to the first nip zone, the first slide plate being aligned with the nip zone, and a retracted position, in which it is remote from the first nip zone, the slide plate being taken out of alignment with the first nip zone for the purpose of allowing access to the first nip zone.

10 Claims, 4 Drawing Sheets

(56) References Cited

U.S. PATENT DOCUMENTS

| | | | | |
|---|---|---|---|---|
| 4,570,922 | A | * | 2/1986 | Akers .......................... 271/178 |
| 6,181,712 | B1 | * | 1/2001 | Rosengren ................... 370/474 |
| 7,967,291 | B1 | * | 6/2011 | Ayala et al. .................. 271/303 |
| 7,988,151 | B2 | * | 8/2011 | Kinoshita et al. ............. 271/303 |

| | | | |
|---|---|---|---|
| 2003/0094749 | A1 | 5/2003 | Kallin et al. |

OTHER PUBLICATIONS

International Search Report from PCT/FR2012/052457 dated Feb. 15, 2013; 2 pages.

* cited by examiner

CONVEYOR DEVICE FOR CONVEYING FLAT ARTICLES ON EDGE, AND A POSTAL SORTING MACHINE

CROSS REFERENCE TO RELATED APPLICATION(S)

This application is a 35 U.S.C. §371 National Phase Entry Application from PCT/FR2012/052457, filed Oct. 25, 2012, designating the United States and also claims the benefit of French Application Ser. No. 1161558, filed Dec. 13, 2011, the disclosures of which are incorporated herein by reference in their entirety.

TECHNICAL FIELD

The invention relates generally to a conveyor device for conveying flat articles on edge, including at least one back belt and at least one front belt that define a first nip zone for conveying the flat articles along a first path, the conveyor device including at least one conveying strip provided with a first slide plate serving to support the flat articles being conveyed along the first path.

The invention also relates to a postal sorting machine for sorting flat articles on edge, including such a conveyor device.

In the meaning of the invention, a "flat article" means, particularly but not exclusively, a mailpiece. Mailpieces that are suitable for being stacked using the device of the invention may be of various sizes, and they may also have a variety of mechanical characteristics, in particular as regards stiffness. Such a mailpiece may, inter alia, be an ordinary letter, a magazine, an envelope with or without a window, a newspaper, or indeed a catalogue wrapped in plastic or in paper, with or without gussets.

PRIOR ART

Conveyor devices for conveying flat articles on edge are in common use, in particular in the field of postal sorting machines. Such devices generally include two motor-driven belts provided facing each other and defining between them a nip zip zone through which the flat articles are conveyed. Such a known device includes a foot belt receiving the edges of the flat articles and two motor-driven side belts facing each other and defining the nip zone between them. In known manner, the belts are of the endless type and are guided by pulleys. In order to procure a nip zone adapted to the variation in the thicknesses of the flat articles from one article to another, the belts may be biased facing the nip zone by "low-pressure" elastically deformable wheels bearing against them. In such a manner as to ensure that flat articles of large size are held properly while they are being conveyed, each side belt may be a double belt and thus comprise two belts distributed over the heights of the flat articles. However, large and floppy flat articles tend to deform between the belts, and might cause jams and/or be damaged. In another version, it is known that a belt can be used that is disposed facing a stationary conveying strip, the belt and the conveying strip defining the nip zone. In that way, deformation of floppy and large-size flat articles is limited. However, the nip zone is difficult to access and, in the event of a jam, it is difficult to take action on it. An intermediate solution is presented by Publication FR 2 787 773 that describes a conveyor device for conveying floppy flat articles. That conveyor device has a foot plate or "baseplate" receiving the flat articles on edge, a first side belt of large width being disposed facing stationary guides distributed in the height direction over the width of the first belt so as to retain the vertical floppy flat articles. That conveyor device also includes a second belt, of width less than the width of the first belt, and disposed facing the first belt, on the same side of the postal articles as the stationary guides. That conveyor device thus makes it possible to hold floppy large-size articles over their entire heights. However, that conveyor device does not make it possible to offer easy access to the nip zone and to facilitate clearing jams.

Other known conveyor devices, such as those described, for example, in Publications U.S. Pat. No. 4,431,179, DE 10 2007 007 813, US 2003/0 084 749 and EP 1 344 736 do not procure satisfactory solutions.

SUMMARY OF THE INVENTION

An object of the invention is to remedy that drawback by proposing a conveyor device for conveying flat articles on edge that makes it possible for the flat articles to be conveyed reliably even when they are of large size and floppy, and that facilitates access to the nip zone so as to facilitate clearing jams and performing maintenance operations.

To this end, the invention provides a conveyor device for conveying flat articles on edge, including at least one back belt and at least one front belt that define a first nip zone for conveying the flat articles along a first path, the conveyor device including at least one conveying strip provided with a first slide plate serving to support the flat articles being conveyed along the first path, said conveyor device being characterized in that the conveying strip is mounted to move between a working position in which it is situated in the environment close to the first nip zone, the first slide plate being substantially aligned with the first nip zone, and a retracted position, in which it is remote from the first nip zone, the slide plate being taken out of alignment with the first nip zone for the purpose of allowing access to the first nip zone, the conveyor device having at least one actuation axis embodied by a rod arranged to guide the conveying strip along and about a sliding pivot coupling between its working and retracted positions.

The basic idea of the invention is to provide a conveying strip that is retractable so that it can guide the flat articles successively and reliably, and then be moved out of the way to facilitate access to the nip zone for the purposes of performing maintenance operations and/or operations to clear jams of wedged flat articles.

The conveyor device of the invention may advantageously have the following features:

- the conveyor device may be provided with at least one recessed keying shape and with at least one keying finger, the shape and the finger being suitable for co-operating with each other to prevent the conveying strip from pivoting about the actuation axis when the conveying strip is in its working position and at the start of its movement in translation for going from its working position to its retracted position, one of the elements constituted by the keying shape and the keying finger being provided on a frame carrying the first nip zone, and the other of them being provided on the conveying strip;
- the conveying strip is provided with at least one keying plate extending substantially perpendicularly to the first slide plate, the keying plate being provided with the keying shape, and the frame being provided with the keying finger;
- the conveying strip is provided with at least one handling plate distinct from the keying plate and extending substantially perpendicularly to the first slide plate, the handling plate being provided with at least one through opening making it easier to take hold of the conveying strip so as to move it manually between its working position and its retracted position;

the keying plate and the handling plate each have at least one through orifice, the through orifices being substantially in alignment with each other so that they share the same axis and being suitable for receiving the rod embodying the actuation axis so as to form the sliding pivot coupling;

at least one run of the front belt diverges from the back belt at a first angle, the conveyor device including at least one intermediate belt suitable for co-operating with the front belt to define a second nip zone for conveying the flat articles along a second path, and the conveying strip being provided with a second slide plate that diverges from the first slide plate at a second angle that is substantially equal to the first angle and that, when the conveying strip is in the first working position, is designed to be substantially aligned with the second nip zone so as to support the flat articles being conveyed along a second path;

the first and second slide plates are connected together by the keying plate and by the handling plate; and the keying shape is provided at the free end of the keying plate opposite from the actuation axis.

The invention also relates to a postal sorting machine for sorting flat articles on edge, including a conveyor device as described above.

BRIEF DESCRIPTION OF THE DRAWINGS

The present invention can be better understood and other advantages appear on reading the following detailed description of an embodiment given by way of non-limiting example and with reference to the accompanying drawings, in which.

DESCRIPTION OF THE EMBODIMENTS

With reference to FIGS. 1 to 4, the conveyor device 1 of the invention is designed to be integrated into a postal sorting machine 100 including conveyor means and guide means for conveying and guiding flat articles (not shown) on edge, and separator flaps 101 for steering the flat articles towards sorting outlets (not shown), in compliance with a predetermined sorting plan. The conveyor means comprise a plurality of belts guided by pulleys carried by a frame (not shown) and the guide means comprise, in particular, conveyor plates that are generally stationary.

The conveyor device 1 has first conveyor means coupled to first guide means for the purpose of moving flat articles along a first path represented by arrows C1. The postal sorting machine 100 also has second conveyor means coupled to second guide means for the purpose of moving flat articles along a second path represented by arrows C2 and diverging from the first path C1 starting from a bifurcation at which the separator flap 101 is mounted to pivot about a pivot axis A, between:

a first position (shown in FIG. 4) in which it does not interfere with the first path C1, thereby allowing the flat articles to be conveyed by the first conveyor means along said first path C1; and a second position (shown in FIG. 3) in which it intersects the first path C1 so as to direct the flat articles along the second path C2 so that they are conveyed by the second conveyor means.

Figure 1:
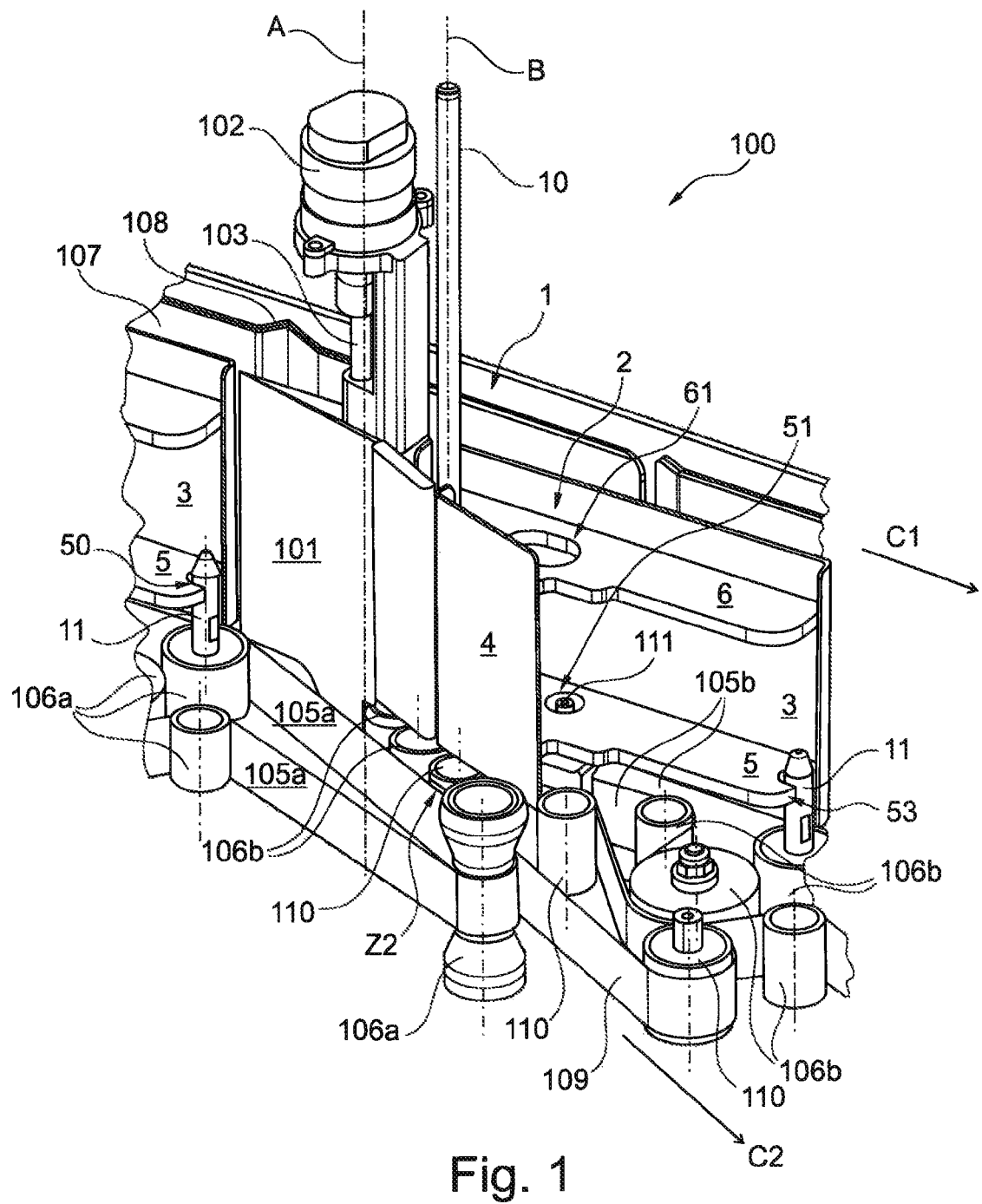
FIGS. 1 and 2 are respective perspective views of a portion of a postal sorting machine including a conveyor device of the invention, the conveying strip being shown respectively in a working position and in a retracted position; the separator flap being in its first position.

The separator flap 101 may be pivoted by the motor or actuator 102 (shown in FIG. 1) connected to the separator flap 101 by the pivot rod 103 (shown in FIG. 1).

The first conveyor means comprise, in particular, a back belt 104 and front belts 105a, 105b disposed in succession along the back belt 104. The back belt 104 and the front belts 105a, 105b are of the endless type, are motor-driven, and are carried by respective ones of main pulleys (not shown) and of front pulleys 106a, 106b so as to nip the flat articles for the purpose of transporting them along the first path C1, upstream from and down to the bifurcation by means of a first front belt 105a, and downstream from the bifurcation by means of a second front belt 105b. The first guide means include a stationary back plate 107 provided with a setback 108 for receiving the end of the separator flap 101 in its second position.

The second conveyor means comprise, in particular, the above-described front belts 105a, 105b in their portions diverging as from the bifurcation at a first angle α (shown in FIGS. 3 and 4), e.g. of 24°, and intermediate belts 109, only one of which is shown. The intermediate belts 109 are of the endless type and are carried by intermediate pulleys 110. The front belts 105a, 105b and the intermediate belts 109 have mutually facing runs suitable for nipping the flat articles so as to transport them along the second path C2 downstream from the bifurcation.

The conveyor device of the invention further includes a conveying strip 2 carried by a rod 10 that is secured to the frame and that is substantially perpendicular to the main and secondary paths C1, C2. The rod 10 is preferably cylindrical and smooth, and defines an actuation axis B.

The conveying strip 2 is provided with a first slide plate 3 and with a second slide plate 4, which plates diverge from each other at a second angle β (shown in FIGS. 3 and 4) that is substantially equal to the first angle α. The first and second slide plates 3 and 4 thus define a V-shape. They are interconnected by a keying plate 5 and by a handling plate 6 that are substantially parallel to each other, and each of which extends perpendicularly between the first and second slide plates 3, 4. The keying plate 5 and the handling plate 6 each have at least one through orifice 50, 60 so that the two through orifices 50, 60 are in alignment so that they share a common axis. These through orifices 50, 60 are preferably substantially cylindrical and are of diameter enabling them to receive the rod 10 with which they form a sliding pivot coupling. Thus, the conveying strip 2 may be pivotally and slidably mounted on the rod 10. The upstream and downstream edges of the first and second slide plates 3, 4 may be curved around the keying plate 5 and around the handling plate 6 so as to avoid creating reentrant angles and so as to limit the risks of jamming. In addition, the keying plate 5 may be provided with holes 51 suitable for receiving, for example, nut heads 111 so as not to hinder access the conveying strip to its working position.

In its "working" low position, the conveying strip 2 is angularly positioned so that its first and second slide plates 3, 4 are positioned facing respectively the back belt 104 & the front belt 105b and the intermediate belt 109 & the front belt 105a so as to form nip zones for nipping the flat articles along respective ones of the first and second paths C1, C2. In this low position, it is advantageous for the conveying strip 2 not to be movable angularly in order to procure effective guiding. For this purpose, the free end of the keying plate 5 is provided with a recessed keying shape 53 suitable for receiving a keying finger 11 provided on the frame to prevent the conveying strip 2 from pivoting. In addition, in the working position, the conveying strip 2 is in an environment that is very cluttered with the pulleys and belts necessary for conveying the flat articles. In the event of jamming occurring behind the conveying strip 2 and/or for the purpose of performing maintenance operations, it can be necessary to access the back zone situated behind the conveying strip 2, between the conveying strip 2 and the back belt 104. Therefore, the conveying strip 2 is retractable between its working position and a retracted position. For this purpose, the conveying strip 2 should be moved in translation along the rod 10 until it is clear of the cluttered environment. At the start of this movement, the movement in translation is guided by co-operation between the keying shape 53 and the keying finger 11. Then, once the conveying strip 2 is clear, it should be caused to pivot about the actuation axis B towards its working position in which its first and second slide plates 3, 4 are no longer in alignment respectively with the back belt 104 & the front belt 105B, and with the intermediate belt 109 & the front belt 105a. The back zone of the conveying strip 2 is thus freely accessible.

In order to facilitate moving the conveying strip 2, the handling plate 6 provided above the keying plate 5 may be provided with a through opening 61 allowing a finger or a tool to pass through.

Figure 2:
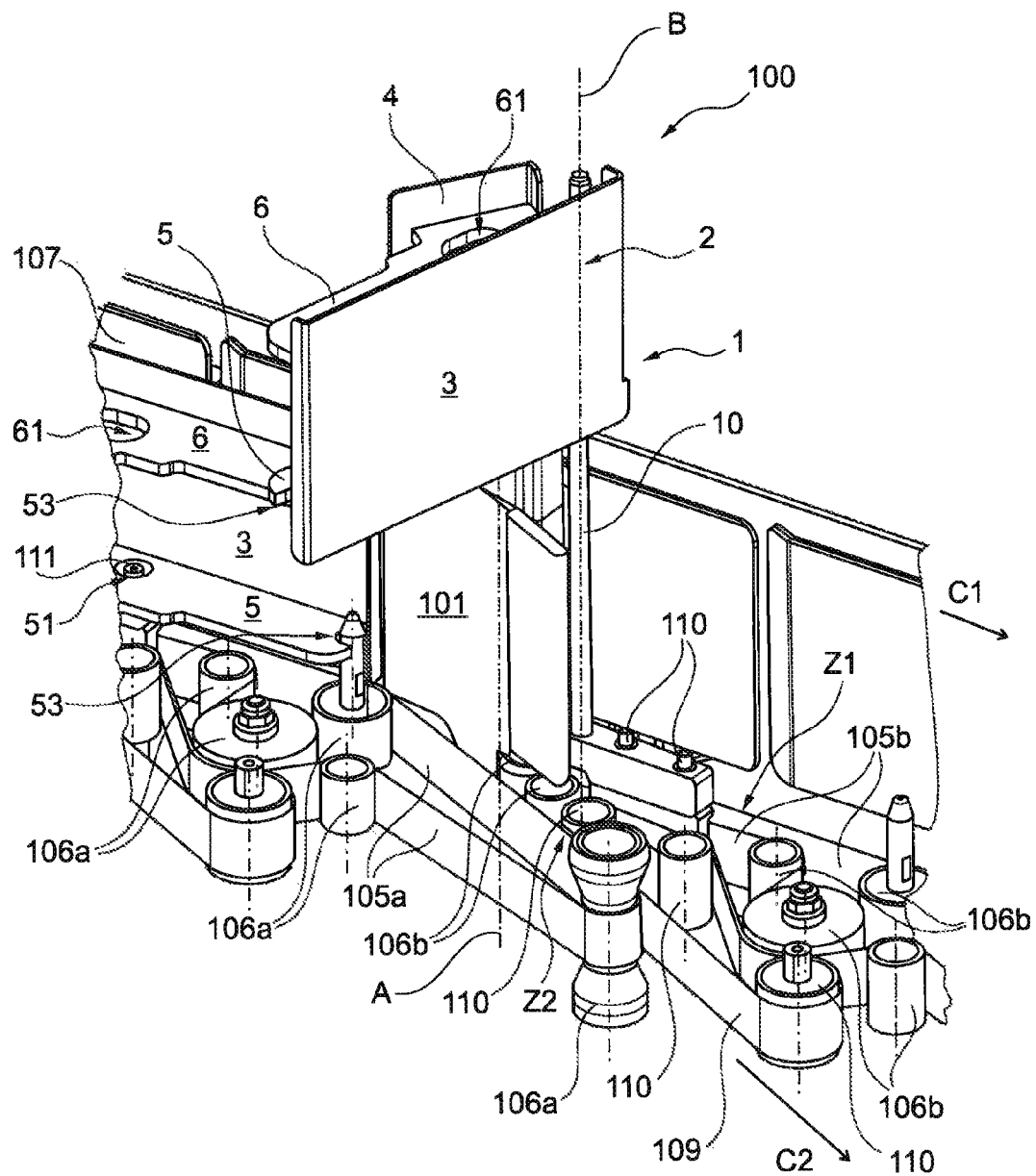
Figure 3:
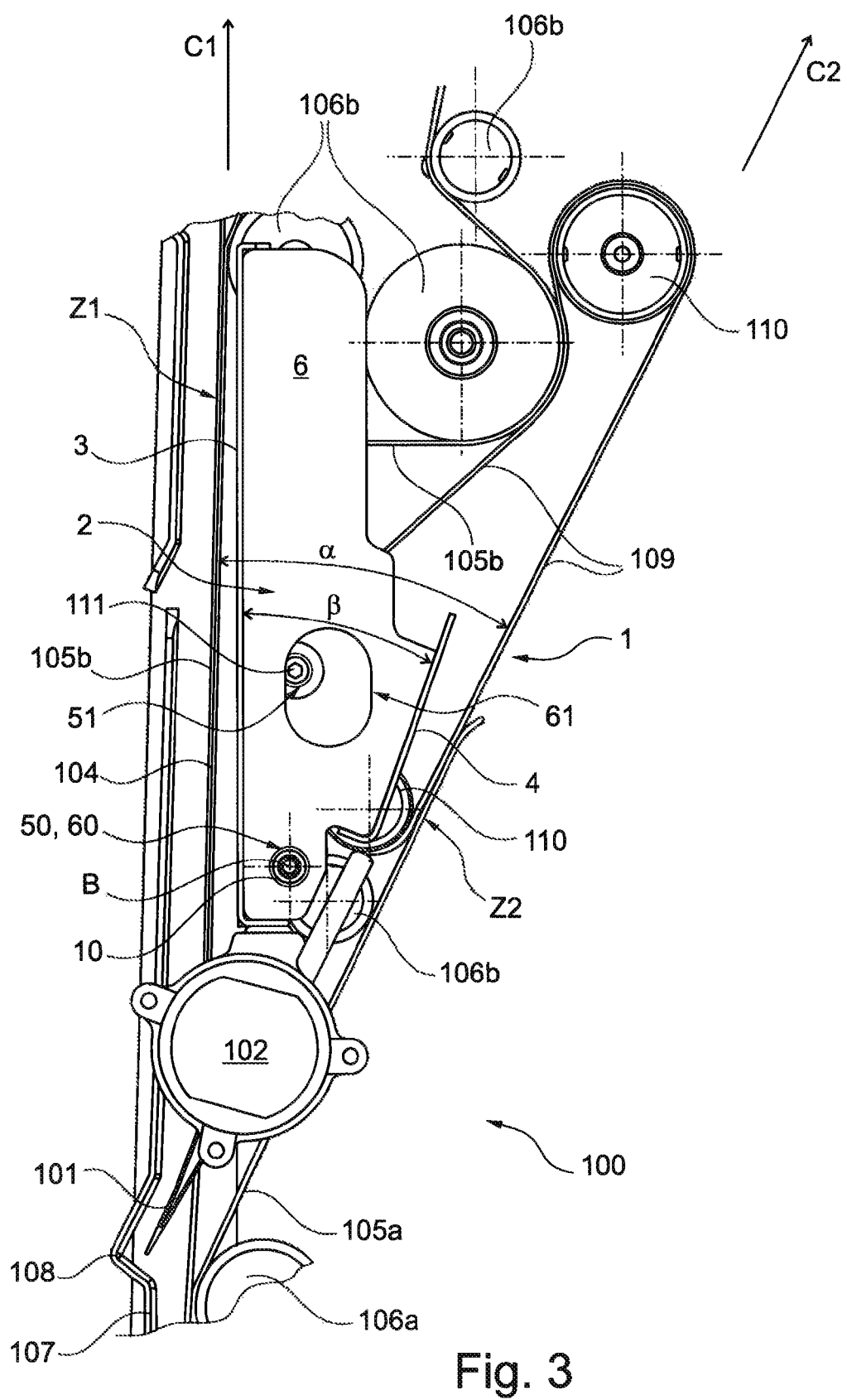
FIGS. 3 and 4 are views from above of the conveyor device shown in FIGS. 1 and 2, the conveying strip being shown respectively in a working position and in a retracted position, and the separator flap being respectively in a second. position and in its first position.
Figure 4:
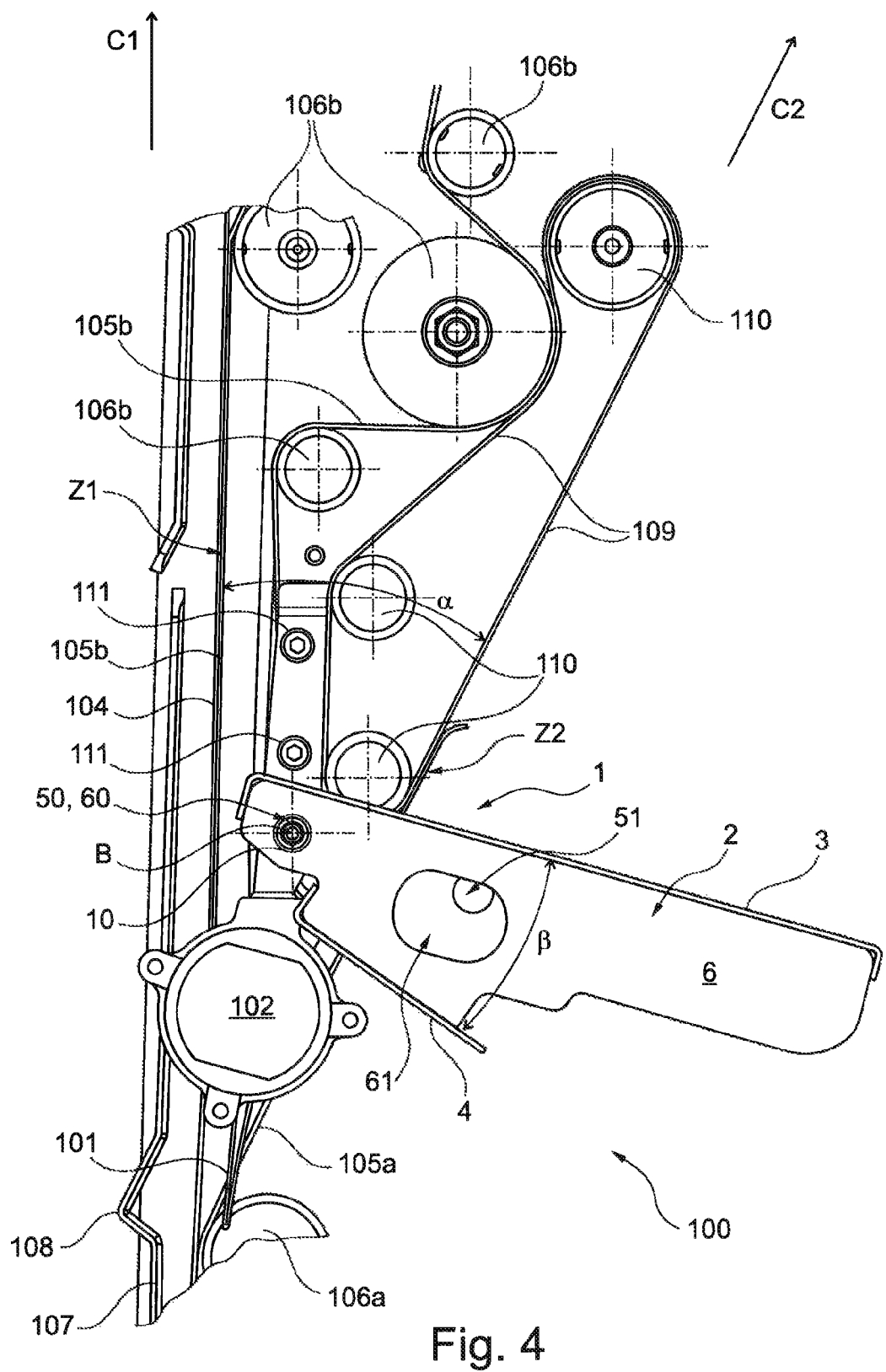

As appears in particular from FIGS. 1 and 2, the postal sorting machine 100 of the invention may have a plurality of sorting outlets, only one of which is shown, upstream from each of which a separator flap 101 and a conveying strip 3 are provided. For this reason, in FIGS. 1 and 2, it is possible to see an upstream conveying strip 3 and a downstream conveying strip 3 that are similar to and independent from each other and that bear the same references.

The invention claimed is:

1. A conveyor device for conveying flat articles on edge, comprising:
at least one back belt and at least one front belt that define a first nip zone for conveying said flat articles along a first path,
at least one conveying strip provided with a first slide plate serving to support said flat articles being conveyed along said first path,
wherein said conveying strip is mounted to move between a working position in which it is situated close to said first nip zone, said first slide plate being substantially aligned with said first nip zone, and a retracted position, in which it is remote from said first nip zone, said slide plate being taken out of alignment with said first nip zone so as to allow access to said first nip zone, and wherein said conveyor device has at least one actuation axis embodied by a rod arranged to guide said conveying strip along and about a sliding pivot coupling between its working and retracted positions.

2. A conveyor device according claim 1, further comprising at least one recessed keying shape and at least one keying finger, the shape and the finger being suitable for co-operating with each other to prevent said conveying strip from pivoting about said actuation axis when said conveying strip is in its working position and at the start of its movement in translation for going from its working position to its retracted position, and a frame carrying said first nip zone, wherein one of said keying shape and said keying finger is provided on said frame carrying said first nip zone, and the other of said keying shape and said keying finger is provided on said conveying strip.

3. A conveyor device according to claim 2, wherein said conveying strip is provided with at least one keying plate extending substantially perpendicularly to said first slide plate, and wherein said keying shape is provided on said keying plate, and wherein said frame is provided with said keying finger.

4. A conveyor device according to claim 3, wherein said conveying strip includes at least one handling plate distinct from said keying plate and extending substantially perpendicularly to said first slide plate, said handling plate being provided with at least one through opening allowing a user to take hold of said conveying strip so as to move it manually between its working position and its retracted position.

5. A conveyor device according to claim 4, wherein said keying plate and said handling plate each have at least one through orifice, said through orifices being substantially in alignment with each other so that they share the same axis and being suitable for receiving said rod embodying said actuation axis so as to form said sliding pivot coupling.

6. A conveyor device according to claim 4, wherein at least one run of said front belt diverges from said back belt at a first angle, and wherein said conveyor device further comprises at least one intermediate belt suitable for co-operating with said front belt to define a second nip zone for conveying said flat articles along a second path, and wherein said conveying strip includes a second slide plate that diverges from said first slide plate at a second angle that is substantially equal to said first angle and that, when said conveying strip is in said first working position, is designed to be substantially aligned with said second nip zone so as to support said flat articles being conveyed along said second path.

7. A conveyor device according to claim 6, wherein said first and second slide plates are connected together by said keying plate and by said handling plate.

8. A conveyor device according to claim 7, wherein said keying shape is provided at the free end of said keying plate opposite from said actuation axis.

9. A postal sorting machine for sorting flat articles on edge, said postal sorting machine including at least one conveyor device according to claim 1.

10. A postal sorting machine, said postal sorting machine comprising:
at least one conveyor device for conveying flat articles on edge, including:
at least one back belt and at least one front belt that define a first nip zone for conveying said flat articles along a first path,
at least one conveying strip provided with a first slide plate serving to support said flat articles being conveyed along said first path,
wherein said conveying strip is mounted to move between a working position in which it is situated close to said first nip zone, said first slide plate being substantially aligned with said first nip zone, and a retracted position, in which it is remote from said first nip zone, said slide plate being taken out of alignment with said first nip zone so as to allow access to said first nip zone, and wherein said conveyor device has at least one actuation axis embodied by a rod arranged to guide said conveying strip along and about a sliding pivot coupling between its working and retracted positions.

* * * * *